United States Patent [19]
Streeter et al.

[11] Patent Number: 6,127,744
[45] Date of Patent: Oct. 3, 2000

[54] METHOD AND APPARATUS FOR AN IMPROVED MICRO-ELECTRICAL MECHANICAL SWITCH

[75] Inventors: Robert D. Streeter; Lee A. McMillan, both of Fort Wayne, Ind.

[73] Assignee: Raytheon Company, Lexington, Mass.

[21] Appl. No.: 09/198,669

[22] Filed: Nov. 23, 1998

[51] Int. Cl.[7] .................................................. H01H 57/00
[52] U.S. Cl. .......................................... 307/125; 200/181
[58] Field of Search ........................... 307/125; 200/181; 361/234

[56] References Cited

U.S. PATENT DOCUMENTS

| | | | |
|---|---|---|---|
| 5,051,643 | 9/1991 | Dworsky et al. | 200/181 |
| 5,278,368 | 1/1994 | Kasano et al. | 200/181 |
| 5,367,136 | 11/1994 | Buck | 200/181 |
| 5,578,976 | 11/1996 | Yao | 200/181 |
| 5,619,177 | 4/1997 | Johnson et al. | 337/140 |
| 5,677,823 | 10/1997 | Smith | 361/234 |
| 5,771,321 | 6/1998 | Stern | 385/31 |
| 6,016,092 | 1/2000 | Qui et al. | 333/262 |
| 6,040,611 | 3/2000 | De Los Santos et al. | 257/415 |
| 6,046,659 | 4/2000 | Loo et al. | 200/181 |
| 6,057,520 | 5/2000 | Goodwin-Johansson | 200/181 |

*Primary Examiner*—Stephen W. Jackson
*Assistant Examiner*—Rios Roberto
*Attorney, Agent, or Firm*—Daly, Crowley & Mofford, LLP

[57] ABSTRACT

A method, device and circuit which applies an electrostatic repulsion pushing force to a MEM switch armature during an opening process. The repulsive force adds to the spring restoration force on the armature, increasing the opening speed of the switch and aids in overcoming stiction effects. The inventive switch includes a contact electrically connected to a first terminal of the switch. A throw is electrically connected to a second terminal of the switch. Finally, a mechanism is provided for opening the switch by electrostatically causing the throw to disengage the contact. In the illustrative implementation, the mechanism for opening the switch includes a first charge storage structure mounted on the throw and a second charge storage structure mounted in proximity to the first charge storage structure. When charges are applied between the first and the second charge storage structures, a force of repulsion is created or a force of attraction is created depending on the polarity of the potential.

19 Claims, 4 Drawing Sheets

FIG. 1

PRIOR ART

FIG. 2

PRIOR ART

METHOD AND APPARATUS FOR AN IMPROVED MICRO-ELECTRICAL MECHANICAL SWITCH

BACKGROUND OF THE INVENTION

1. Field of the Invention

The present invention relates to electrical and electronic circuits and components. More specifically, the present invention relates to micro-electromechanical (MEM) switches.

2. Description of the Related Art

A MEM switch is a switch operated by an electrostatic charge, thermal, piezoelectric or other actuation mechanism and manufactured using micro-electromechanical techniques. A MEM switch may control electrical, mechanical, or optical signal flow. Current MEM switches are usually single pole, single throw (SPST) configurations having a rest state that is normally open. Application of an electrostatic charge to the control electrode (or opposite polarity electrostatic charges to a two-electrode design) will create an attractive electrostatic force ("pull") on the switch causing the switch to close. Currently, the switch opens by removal of the electrostatic charge on the control electrode(s), allowing the mechanical spring restoration force of the armature to open the switch.

Unfortunately, electrostatically actuated MEM switches constructed in accordance with conventional teachings typically close faster than they open and often suffer "stiction" effects that hinder the opening process or cause the switch to fail closed. Hence, the opening and closing ("transition speed") of conventional MEM switches has been limited.

For many current applications, there is a need to increase the transition speed of a MEM switch. Hence, there is a need in the art for further improvements in MEM switches.

SUMMARY OF THE INVENTION

The need in the art is addressed by the MEM design and method of the present invention. In accordance with the inventive teachings, an electrostatic force of repulsion is used to effect operation of a switch from a first state to a second state.

In an illustrative electrical implementation, the MEM switch includes a contact electrically connected to a first terminal of the switch. A throw is electrically connected to a second terminal of the switch. Finally, a mechanism is provided for opening the switch by electrostatically causing the throw to disengage the contact.

In the illustrative implementation, the mechanism for opening the switch includes a first charge storage structure mounted on the throw and a second charge storage structure mounted in proximity to the first charge storage structure. When charges are placed on the first charge storage structure and simultaneously on the second charge storage structure, a force of repulsion (for equal polarity and magnitude) or attraction (for opposite polarity and equal magnitude) is created on the throw. The potential between the two charge storage structures depends on the charge polarities. The charges will also have a potential value referenced to the rest of the MEM switch structure.

Hence, the invention provides a method, device and circuit which applies an electrostatic repulsion pushing force to an MEM switch armature during an opening process. The repulsion force adds to the spring restoration force on the armature, increasing the opening speed of the switch and aids in overcoming stiction effects.

Although the inventive teachings are disclosed with respect to an electrical application, the present teachings may be used for optical, acoustic and other applications as will be appreciated by those skilled in the art.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
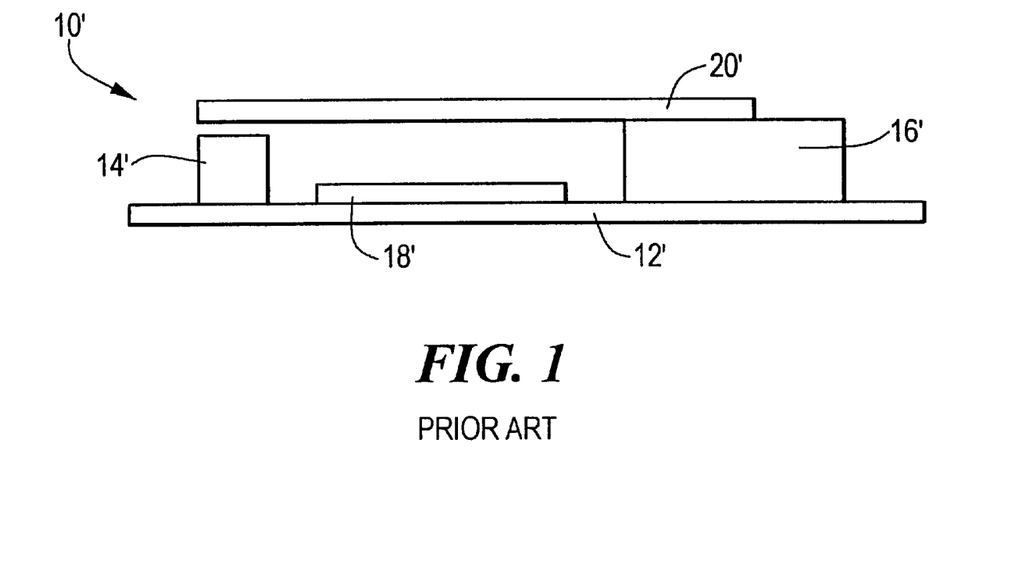
FIG. 1 is a diagram of a conventional electrostatically operated micro-electromechanical (MEM) switch.

FIG. 1 is a diagram of a conventional micro-electromechanical (MEM) switch. The switch 10' has an insulating support substrate 12' which serves as a base. A conductive contact 14' is mounted on one side of the substrate and a cantilever support 16' is mounted on the other. The cantilever support 16' supports a conductive cantilever beam 20'. A conductive control surface 18' is mounted on the substrate 12' between the conductive contact 14' and the cantilever support 16'.

The switch 10' is shown as a normally open (NO) switch contact structure. The open gap between the conductive contact 14' and the cantilever beam 20' is usually a few microns (¹⁄₁,₀₀₀,₀₀₀ meter) wide. When the switch closes, the cantilever beam 20' is in direct electrical contact with the conductive contact 14'.

A slightly larger gap exists between the cantilever beam 20' and the conductive control surface 18'. The larger gap keeps the conductive control surface from contacting the cantilever beam in normal operation. The total device is usually less than 1 mm in length, width and height. If the far end (the unattached end) of the cantilever beam is deflected toward the conductive contact, the cantilever beam will make ohmic contact with the conductive contact and be physically stopped by the contact. The cantilever beam will not make electrical or physical contact with the control surface unless the beam is physically forced to make contact with the control surface.

In normal operation, the MEM switch 10' is drawn closed by placing an electric charge on the conductive control surface 18'. An opposite polarity charge is induced on the inner surface of the conductive cantilever beam 20' opposite to the control surface. This electric charge pair induces an electrostatic (coulomb) attractive force between the two surfaces. If the coulomb force is strong enough to overcome the spring restorative force of the cantilever beam, the coulomb force will deflect the beam toward the control surface and the conductive contact. This will close the switch. The potential between control surface 18' and the rest of the MEM switch determines the charge pair in accordance with Q=CV, where Q is the charge, C is the capacitance between the control surface and the cantilever beam, and V is the applied control voltage $V_c$.

Figure 2:
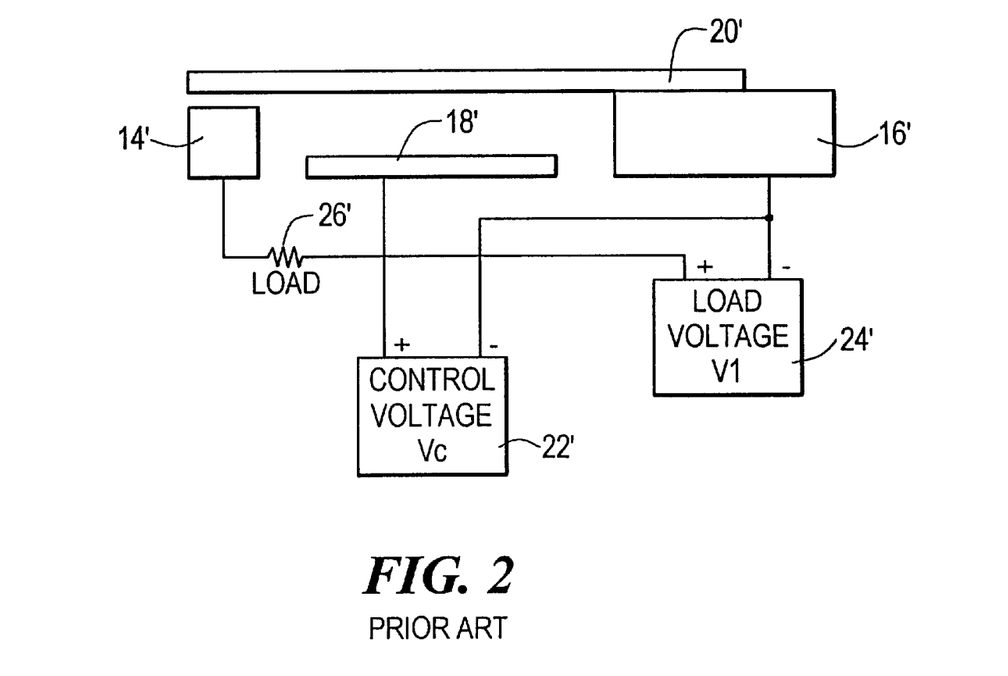
FIG. 2 is a schematic diagram of a typical setup using a conventional MEM switch.

FIG. 2 is a schematic diagram of a typical setup using a conventional MEM switch. Those skilled in the art will appreciate that numerous circuit configurations are permitted using MEM switches. In FIG. 2, a control voltage supply 22' provides a control voltage $V_c$ to the control surface 18'. The control voltage $V_c$ induces a charge on the control surface in accordance with the relation Q=CV. The load voltage $V_1$, supplied by a load voltage supply 24', allows current to flow through the load (delivering power to the load) when the MEM switch closes.

The cantilever beam restorative force is linearly proportional to the displacement from the rest position of the beam. A small coulomb force will make a small deflection of the beam, but will not cause the beam to fully deflect to the conductive contact. As the coulomb force raises by increasing the electric charge on the control surface, the beam deflection will increase. Additionally, the coulomb force is inversely proportional to the square of the separation distance between the charges. Thus, as the coulomb force draws the beam closer to the contact, the distance between the charged surfaces will decrease. This decreased distance between the charges will increase the coulomb force on a square-law basis without a proportional increase in the electric charge stored on the control surface. This action identifies a minimum switching charge magnitude (voltage) on the control surface that results in a continuous net attraction of the cantilever beam toward the control surface. Additionally, since the coulomb force (above the minimum required) is increasing on a square law basis while the cantilever spring restorative force opposing the coulomb force is only increasing linearly, the cantilever beam experiences a continuously increasing acceleration as it approaches the control surface and the conductive contact.

As long as the coulomb force exceeds the spring restorative force at every point in the deflection of the beam, the MEM switch will continue to close, and the beam will accelerate as it approaches the conductive contact.

It should be obvious that the maximum coulomb force exists as the cantilever beam touches the conductive contact and is at its closest approach to the control surface. The switch will be held closed by this maximum force. It should also be apparent that there is a maximum coulomb charge that can be applied to the control surface. An excess charge may result in an arc if the dielectric electric withstanding field strength (between the control surface and any other MEM switch structure) is exceeded or in an excess deflection of the cantilever beam causing it to touch the control surface. Either of these actions will result in a discharge of the electrostatic charge and the elimination of the coulomb force holding the MEM switch closed.

Figure 5:
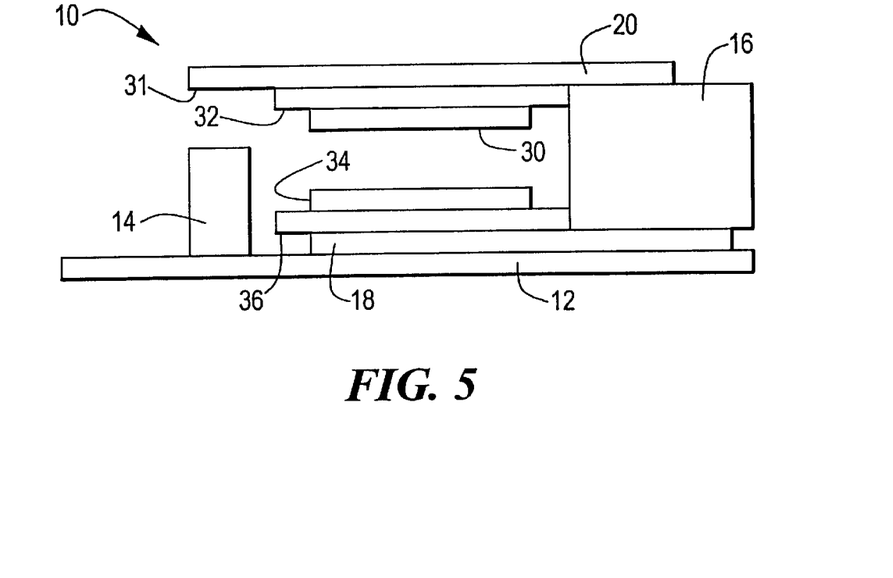
FIG. 5 is a diagram of an improved MEM switch constructed in accordance with the teachings of the present invention.
Figure 6:
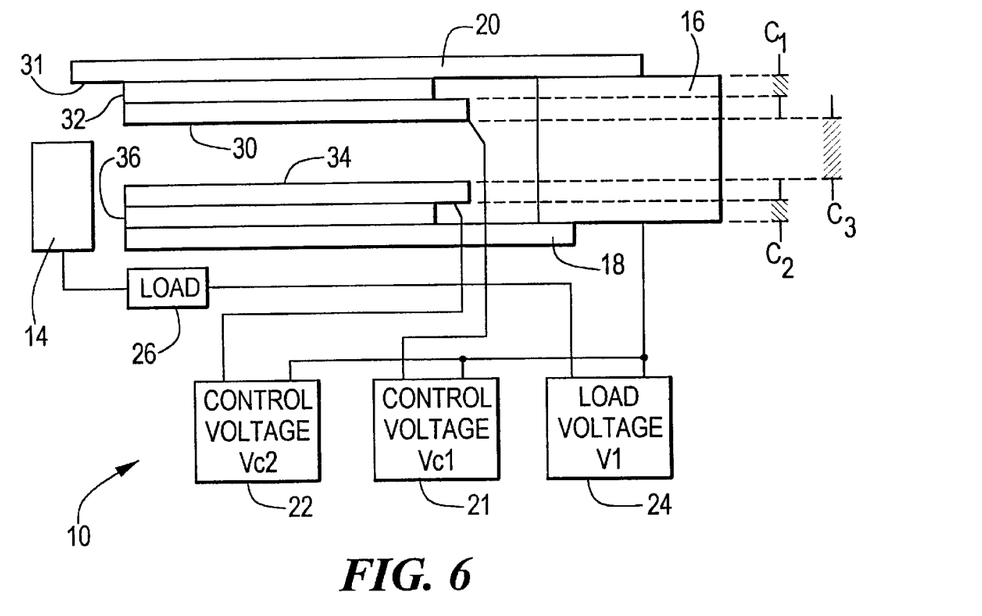
FIG. 6 is a schematic diagram of an electrical circuit using the improved MEM switch of the present invention.

Those skilled in the art may consider placing an insulating layer of material on control surfaces 30' and 34' to prevent contact arc or discharge of the control surfaces if they touch (as shown in FIGS. 5 and 6). The question of surface charges on such an insulator layer must be addressed in their impact on the coulomb force between the two charged control surfaces 30' and 34'.

Another possible configuration to eliminate the problems that occur when control surfaces 30' and 34' physically touch is to put a wide mesh grid of insulation material on one control surface, leaving most of the control surfaces exposed but preventing mechanical contact between surfaces 30' and 34'.

The application of a fixed direct current (D.C.) voltage $V_c$ to the control surface is the simple case of the control waveform driving the MEM switch to the closed position. The voltage $V_c$ may be of either polarity, although the physical structure and the materials used in fabrication of the MEM switch may favor one polarity over the other. The application of the voltage to the control surface in the circuit of FIG. 2 will cause a charging current to flow briefly in the control circuit (consisting of the control surface 18', the beam 20' and the control voltage supply 22'). This charging current can be thought of as charging the capacitor formed by the control surface and the cantilever beam. The control voltage $V_c$ must be above the minimum (for switch closure) and below the maximum (to prevent arcing) for the physical structure of the MEM switch if proper operation is to occur.

Ideally, when the control surface is charged, the voltage $V_c$ may be removed. This is usually not done due to leakage effects in the MEM switch and the changes that occur during switch closure.

It is also possible to reverse the control polarity while the switch is held closed so long as the time needed to discharge and recharge the control surface with the opposite polarity charge is much less than the time required for the cantilever beam to move sufficiently to disconnect the load circuit. The use of polarity reversal drive can create a mechanical wiping action on the load circuit contacts while the switch is closed and may be a benefit for certain contact metallurgy. Polarity reversal may also be useful in association with certain MEM fabrication methods.

The speed of switch closure can be controlled to some degree by controlling the magnitude of the charge on the control surface. The initial charge placed on the control surface will have a maximum value set primarily by arc limitations between the control surface and the remaining elements of the MEM switch. This maximum charge will apply a maximum coulomb force to the cantilever beam, resulting in a maximum initial closure rate for the beam. As the beam approaches the control surface during closure, the capacitance will increase. While application of a constant voltage will result in an increase in the surface charge (through Q=CV) and a resultant increase in the coulomb force beyond the square-law effect, the voltage may exceed the capabilities of the beam to control surface spacing. Thus, it may be necessary to reduce the control voltage as the switch closes to prevent a discharge arc of the stored charge. This leads to a decayed voltage waveshape versus time for the fastest MEM switch closure operation. The shape of the control voltage decay for the fastest closure depends on the constructional details of the MEM switch. When the MEM switch achieves closure, the control voltage must remain between the maximum closed voltage (determined by arc or cantilever deflection) and the minimum voltage needed to provide sufficient coulomb force needed to overcome the cantilever spring restoration force.

Figure 3:
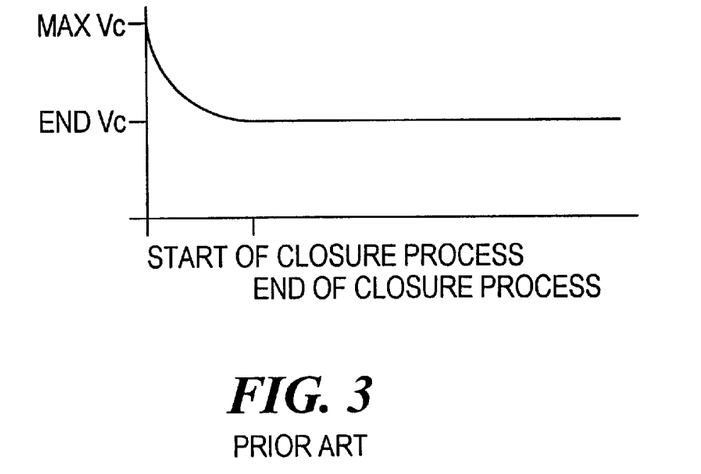
FIG. 3 is a sketch of the control voltage applied to a conventional MEM switch illustrating optimum driving waveform for MEM switch closure.

FIG. 3 is a sketch of the control voltage applied to a conventional MEM switch illustrating optimum driving waveform for MEM switch closure. The opening of a conventional MEM switch depends exclusively on the spring restoration force in the cantilever beam. Since the coulomb force holding the switch closed is stronger than the spring restoration force, the coulomb force must be reduced to a value as close to zero as possible to allow a maximum of opening force from the cantilever beam spring effect. The opening force may also need to overcome "stiction" effects resulting from the Casmir effect of from minor contact adhesion effects. While the control surface charge can be allowed to leak off slowly, this will delay the opening of the MEM switch. The opening speed can be improved by accelerating the discharge of the control surface charge. The proper selection of control voltage waveform can speed the opening process.

The conventional method to open the MEM switch 10' is to force the control surface voltage (relative to the cantilever beam) to zero volts through a low impedance source. A short circuit between the control surface and the cantilever beam is the optimum means of swiftly reducing the control voltage to zero. The electrical effect is to rapidly discharge the capacitor formed by the control surface and the inner surface of the cantilever beam.

A method to further enhance the discharge of the control surface charge is to supply an opposite charge burst prior to driving the control surface voltage to zero. The waveform to accomplish this is shown in FIG. 4.

Figure 4:
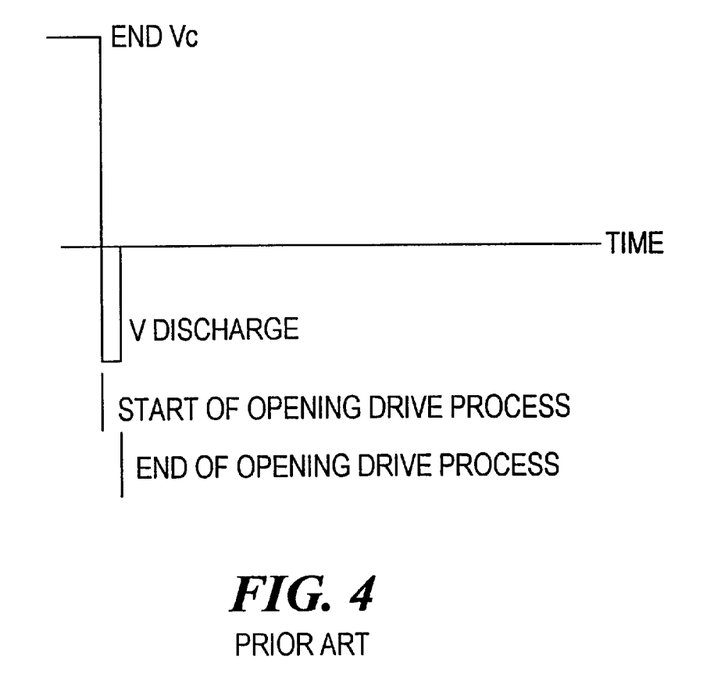
FIG. 4 is a waveform for enhanced conventional MEM switch opening.

FIG. 4 is a waveform for enhanced conventional MEM switch opening. However, this method does have some inherent limitations in that inserting less than the correct opposite charge will not provide the best reduction of coulomb force. Even worse, inserting an excess opposite charge will simply recharge the control surface and cantilever beam with opposite polarity and delay the full reduction of the coulomb force. The speed at which this discharge mechanism can operate is determined by the complex impedance of the control surface current path, the cantilever beam current path (which is the other side of the capacitor storing the surface charges) and the external circuit for the control signal.

The method of the present invention speeds the time required to open a MEM switch constructed in accordance with the teachings provided herein. The inventive switch provides a coulomb repulsion force which assists the cantilever spring force in opening the switch. The two forces act in the same direction and are additive. The teachings of the present invention may allow for switch opening to occur over a shorter time span than is required to close the MEM switch. The opposite condition often occurs in conventional MEM switches. Whereas the conventional MEM switch has only the "pull" closing electrostatic force, the improved switch structure of the present invention has a "push" operation by which an electrostatic coulomb force aids in opening the switch.

FIG. 5 is a diagram of an improved MEM switch constructed in accordance with the teachings of the present invention. As shown in FIG. 5, the improved switch 10 includes an insulating substrate 12, a conductive contact 14, a cantilever support 16, a first conductive surface 18 and a cantilever beam 20 as per the conventional switch 10' of FIG. 1. However, in accordance with the present teachings, a first control surface 30 is provided on the lower surface 31 of the beam 20. The first control surface 30 is insulated from the beam 20 by a layer of insulation 32. A second control surface 34 is disposed over the first conductive surface 18 and is separated therefrom by a layer of insulative material 36.

The physical improvements illustrated in FIG. 5 over the conventional MEM switch structure illustrated in FIG. 1 are the charge storage structure on the cantilever beam 20 (consisting of the conductive beam 20, the first control surface 30 and the dielectric insulator 32 therebetween) and the addition of a charge storage structure (consisting of the first conductive surface 18, the second control surface 34 and the insulator 36 therebetween) as a replacement to the conductive control surface of the conventional MEM switch of FIG. 1. The two charge storage additions are used to induce the equal and like polarity charges that will result in a repulsive coulomb force during the opening process as discussed more fully below. The inventive structure allows for the creation of coulomb forces of either attraction or repulsion as will be appreciated by those skilled in the art. The continuous mechanical connection between the cantilever beam, the cantilever support, the first conductive surface 18 and the support substrate allows the coulomb forces to be properly placed on the cantilever beam.

Those skilled in the art will also recognize that the teachings of the present invention may be realized in additional structural designs that allow one to create two controllable charge storage areas capable of exerting both attractive and repulsive coulomb forces on the cantilever beam. In addition, in certain applications, i.e., optical, the first control surface 30 and insulation 32' may not be required. The first control surface 30 serves to facilitate the electrostatic repulsive force on the beam 20 while isolating the electrical circuit to which the beam 20 is connected on closure of the switch 10. Beam 20' would then have to be insulated from conductor 18' for proper operation.

A variable capacitor is formed by the two control surfaces 30' and 34' and the dielectric (air, vacuum, inert gas, etc.) therebetween. This capacitor must be considered in addition to the two fixed capacitors (34, 36, 18) and (30, 32, 20) formed by the control surfaces mentioned above. The variable capacitance is minimum when the switch is open and is maximum when the switch is closed.

The closing process for the improved MEM switch 10 is the same as that of the conventional MEM switch 10'. Opposite polarity charges are induced on control surfaces 30' and 34'. The opposite charges create an attractive coulomb force as discussed above. These forces must overcome the cantilever spring restorative force, and there is a minimum charge that allows switch closure. There is also a maximum charge and associated voltage that can be tolerated as discussed above.

FIG. 6 is a schematic diagram of an electrical circuit using the improved MEM switch of the present invention. Those skilled in the art will appreciate that numerous circuit configurations are permitted using the improved MEM switch of the present invention. In FIG. 6, a first control voltage supply 21 provides a control voltage $V_{c1}$ to the first control surface 30 on the cantilever beam 20 and a second control voltage supply 22 provides a second control voltage $V_{c2}$ to the second control surface 34. Note the depiction of the equivalent capacitors C1, C2 and C3 representing the fixed capacitor provided by the first control surface 30 and the beam 20, the second control surface 34 and first conductive area 18, and the variable capacitance between the first and second control surfaces 30 and 34, respectively. Charging the control surfaces may be considered to be equivalent to charging the capacitors C1, C2 and C3. The closure speed depends on the time it takes to charge these capacitors. In all probability, equivalent capacitors C1 and C2 will dominate the charging process. Low impedance circuit are required to minimize the charging time of capacitors C1 and C2.

Opposite charges can be induced on the two control surfaces by applying opposite voltage polarities to the two control surfaces as connected in FIG. 6. While the maximum attractive force will result from having the two charges on capacitors C1 and C2 equal and opposite, there need not be charge equality on the two control surfaces. Further, there need not be a specific voltage polarity on the first or the second control surface. Nonetheless, a specific implementation may favor a defined polarity structure or a continuous variation of polarity in the driving signals.

As discussed above with respect to the conventional MEM switch of FIG. 2, the application of fixed direct current (D.C.) voltages $V_{c1}$ and $V_{c2}$ to the control surfaces 30 and 34 of the improved MEM switch 10 of the present invention is the simple case of the control waveform driving the MEM switch 10 to the closed position. Voltages $V_{c1}$ and $V_{c2}$ may be combined (for closure) into an isolated voltage $V_c$ connected between 30 and 34 or (in the conventional switch) 18 and 20. The voltage $V_c$ may be of either polarity, although the physical structure and the materials used in fabrication of the MEM switch may favor one polarity over the other. The application of the voltage to the control surfaces 30 and 34 will cause a charging current to flow briefly in the control circuit (consisting of the first and second control surfaces 30 and 34 and the first and second control voltage supplies 21 and 22). This charging current can be thought of as charging the capacitor C3 formed by the first and second control surfaces 30 and 34, respectively. The difference in potential between the control voltages $V_{c1}$ and $V_{c2}$ must be above the minimum and below the maximum for the physical structure of the MEM switch if proper operation is to occur. This minimum voltage and charge is dependent on the physical parameters of the switch and variations in the fabrication process. It is normally determined experimentally for each and every switch. Typical values are 5 to 50 volts.

Similarly, the maximum voltage and change is also determined experimentally, although it is high enough above the minimum that it is typically not measured, since measurement (and resultant arc) may have the side effect of destruction of the switch elements.

As per the conventional MEM switch 10' of FIG. 1, the speed of closure of the switch 10 can be controlled to some degree by controlling the magnitude of the charges on the control surfaces. The initial charges placed on the control surfaces will have a maximum value set primarily by arc limitations between the control surfaces and the remaining elements of the MEM switch. This maximum charge will apply a maximum coulomb force to the cantilever beam, resulting in a maximum initial closure rate for the beam. As the beam approaches the control surface during closure, the capacitance will increase. While application of a constant voltage will result in an increase in the surface charge (through Q=CV) and a resultant increase in the coulomb force beyond the square-law effect, the voltage may exceed the capabilities of the beam to control surface spacing. Thus, it may be necessary to reduce the control voltage as the switch closes to prevent a discharge arc of the stored charge. This leads to a decayed voltage wave shape versus time for the fastest MEM switch closure operation. The shape of the control voltage decay for the fastest closure depends on the constructional details of the MEM switch 10. When the MEM switch achieves closure, the control voltage must remain between the maximum closed voltage (determined by arc or cantilever deflection) and the minimum voltage needed to provide sufficient coulomb force needed to overcome the cantilever spring restoration force. The optimum control voltage driving waveform for MEM switch closure depicted in FIG. 3 is applicable to the improved MEM switch 10 of the present invention as well.

For the purposes of switch closure (only), it is possible to set the first control voltage, $V_{c1}$, equal to zero. This is equivalent to short circuiting capacitor C1. The action of the charge distribution then becomes identical to the conventional MEM switch case, and second control voltage, $V_{c2}$, (relative to the rest of the MEM switch structure) determines the closure operation of the improved MEM switch 10. Setting the control voltage to zero also has the secondary benefit of causing the first control surface 32 to act as an electrostatic shield for the cantilever beam 20. This may be useful in low level signal applications where the control signal could be considered as a potential source of interference to the switched signal. Under such conditions, 16 must be an insulator and $V_L$ must be connected directly to 20, with no connection to $V_{c1}$ or $V_{c2}$.

It is also possible to reverse the above case, and set the second control voltage $V_{c2}$, equal to zero. This is a mode that is available only in the improved MEM switch 10 of the present invention. The operation is otherwise identical to the conventional case. The electrostatic shield offered by the first control surface 30 is no longer applicable for this case.

The MEM switch is held in the closed position by a continuous application of the electrostatic attraction force. This usually means maintaining the control voltages $V_{c1}$ and $V_{c2}$ for the duration of the closure time, thus maintaining the charges on the control surfaces responsible for the coulomb attractive force.

Figure 7:
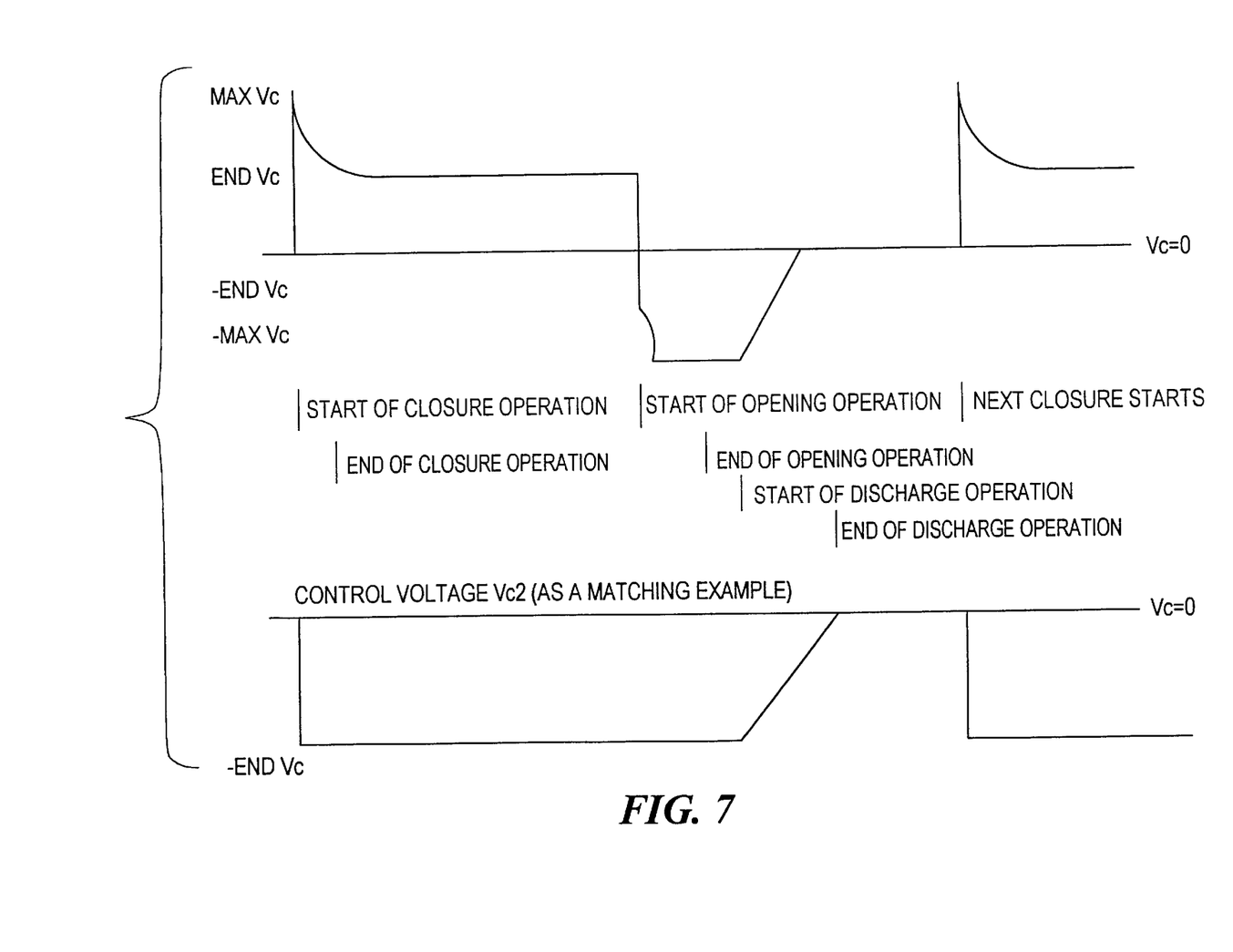
FIG. 7 illustrates exemplary waveforms for driving the improved MEM switch of the present invention.

There are a large variety of values and waveforms for the first and second control voltages $V_{c1}$ and $V_{c2}$ that will cause the MEM switch 10 to close. FIG. 7 depicts one of the many possible drive waveforms for the improved MEM switch 10 of the present invention. In FIG. 7, both the closing and opening process waveforms are shown.

The process for opening the improved MEM switch of the present invention is new and novel. The control voltages $V_{c1}$ and $V_{c2}$ are applied to the first and second control surfaces 30 and 34 respectively and are set equal in magnitude and polarity and non-zero to create a repulsion electrostatic charge that aids in opening the switch. In the conventional MEM switch 10' the control voltage is just set to zero to remove the electrostatic charge. In the simplest configuration, either $V_{c1}$ or $V_{c2}$ is reversed in polarity with respect to the control voltages used to close the improved MEM switch 10. This places charges of the same polarity on the two control surfaces 30 and 34, and creates a repulsion electrostatic coulomb force pushing the cantilever beam away from the conductive contact.

This repulsion force adds directly to the spring restorative force of the cantilever beam 20 and pushes the cantilever beam away from the contact 14 more rapidly than the spring restorative force alone. Depending on the design configuration of the MEM switch 10, the repulsion force can be significantly larger than the spring restorative force, resulting in a switch design that is significantly more resistant to contact "stiction" problems and which opens very rapidly.

With respect to the need to avoid excess voltage to prevent arcing, it should be noted that in the process of opening the improved MEM switch, there cannot be an arc between the two control surfaces if they are at the same or nearly the same potential and polarity. Thus, the opening voltage is limited by the arc voltage to other structures of the MEM switch 10 rather than between the control surfaces as was noted for the conventional MEM switch 10'.

FIG. 7 provides an example of the control waveforms appropriate to open the improved MEM switch. The waveforms shown are two of a variety of waveforms that are possible within the scope of the present teachings. Some broad limitations can be placed on the waveforms as shown. The voltages "Max Vc" and "End Vc" of either polarity must not result in arcing to any element of the MEM switch 10. During the closing operation as shown, control voltages $V_{c1}$ and $V_{c2}$ must be of opposite polarity. Optimum attraction coulomb force will result if the two voltages $V_{c1}$ and $V_{c2}$ are maximum, equal, and opposite polarity. During the opening operation, control voltages 1 and 2 must be the same polarity. Optimum repulsion force will exist if the two voltages are maximum, equal, and the same polarity. The start and end of the closure and opening process are indicated in the figure.

Although FIG. 7 shows D.C. (direct current) voltages as the driving waveform, A.C. (alternating current) voltages may also be used. The use of A.C. driving voltages will cause a constant charging, discharging, and opposite polarity recharging of the equivalent capacitors C1, C2, and C3. A.C. waveforms may be useful in combating dielectric polarization that reduces the coulomb force available. The driving waveforms should always hold the correct polarity structure on control surfaces 30 and 34.

FIG. 7 also shows an optional discharge operation following the switch opening process. The purpose of this discharge operation is to remove the electrostatic coulomb repulsive force applied to the cantilever beam when it is in the open position. If the coulomb force remains applied to the beam 20, the cantilever beam will be pushed past the open rest position (the neutral force open position) to a position of greater opening. The greater opening will enhance the voltage that the switch can withstand when open. It will also increase the cantilever spacing from the control surface attached to the substrate and the spacing to the conductive contact. The increased spacing will result in greater signal path isolation and a reduced initial coulomb attractive force during the closing process. The increased spacing will also force a longer time for the switch to close. The increased closing time is somewhat compensated by the cantilever spring restorative force pushing the beam back to the neutral open position. There exists a trade-off between the switch closure time and the switch open standoff voltage rating (and isolation) as a result of the coulomb repulsive force available in the improved MEM switch 10.

Although a linear discharge waveform in shown in FIG. 7, any appropriate means of discharge may be used. Generally, it may be optimum to allow the charges on each control surface to decay in the same proportion as a function of time. This will result in a reduction in the magnitude of the coulomb force without encountering secondary effects that may result from discharging the two control surfaces in unequal time frames.

FIG. 3 previously presented an optional waveform to enhance the speed of closure by utilizing a higher initial voltage at the start of the closing operation, and reducing the voltage as the closing operation progresses to an end closure voltage. That waveform is also shown in FIG. 7 on control voltage $V_{c1}$. Control voltage $V_{c2}$ is shown with an optional waveform that is constant during closure. Either waveform can be used in any combination desired for control voltages $V_{c1}$ and $V_{c2}$. There are other waveforms also acceptable for switch closure, including the previously mentioned A.C. waveforms. If the waveforms of control voltages $V_{c1}$ and $V_{c2}$ both contain the increased initial voltage (+Max Vc and −Max Vc at the start of closure) the limitation against arcing must continue to apply.

The opening operation can potentially benefit from the same increased voltage in the case of the improved MEM switch 10. The use of the increased voltage is shown on control voltage $V_{c1}$, but it may also be used on control voltage $V_{c2}$ if desired, subject to the limitation on arcing to other structures in the MEM switch. As shown, control voltage $V_{c2}$ uses a constant voltage during the opening operation, and this voltage is equal to the voltage used to close the switch. Control voltage $V_{c1}$ starts the opening process at the "end Vc" voltage of the closing operation. As the charge on the equivalent capacitor C1 is reversed, the voltage may be (rapidly) increased to the arc-limited value "Max Vc". As the cantilever beam 20 draws away from the conductive contact 14, the spacing between the two control surfaces 30 and 34 will increase. Since the two control surfaces 30 and 34 are now at the same polarity, the maximum voltage is now determined by arc limitations to other MEM switch structures. The shape of the voltage increase is bounded by the arc voltage, and for example may be determined by the discharge and opposite polarity recharge between the two control surfaces 30 and 34.

FIG. 7 also assumes that the maximum allowable voltage on the first control surface 30 is "+Max Vc" or "−Max Vc", which defines the voltage peak values shown in FIG. 7.

By way of example, and with reference to FIGS. 6 and 7, closure is initiated by applying +50 volts to control surface 30 relative to 20, 16, 18 and by applying −50 volts to control surface 34 relative to 20, 16, 18 which creates an attractive coulomb force between 30 and 34 based on 100 volts. The charges will be determined by Q=CV for the (30-20) and (34-18) capacitor pairs and the (30-34) capacitor.

Opening is initiated by applying −50 volts to control surfaces 30 relative to 20, 16, 18 and by leaving 34 and −50 v which creates a repulsive coulomb force between 30 and 34 based on the "equal" and like polarity charges on those surfaces. There is a potential difference between (30, 34) and the other components of the switch.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. An MEM switch comprising:

a cantilever beam having first and second ends;

a cantilever support member coupled to the second end of the cantilever beam;

a first insulative layer disposed on the cantilever beam;

a first control surface disposed on the first insulative layer such that the first control surface, the first insulative layer and the cantilever beam form a first capacitor having a substantially fixed capacitance;

a first conductive surface opposing the cantilever beam;

a second insulative layer disposed on the first conductive surface; and a second control surface disposed on the second insulative surface and facing the first control surface such that the second control surface, the second dielectric layer, and the first conductive surface form a second capacitor having a substantially fixed capacitance, and the first and second control surfaces form a third capacitor having a variable capacitance that is determined by the position of the cantilever beam.

2. The switch according to claim 1, wherein the cantilever beam, the cantilever support member, and the first conductive surface are connected so as to be at the same electrical potential.

3. An MEM switch, comprising:

a cantilever support member;

a cantilever beam having first and second ends, the first end being coupled to the cantilever support member;

a contact member spaced from the cantilever support member for contacting the second end of the cantilever beam;

a first conductive surface opposing the cantilever beam;

a first dielectric layer disposed on the cantilever beam;

a first control surface disposed on the first dielectric layer, the first control surface for receiving a first control voltage;

a second dielectric layer disposed on first conductive surface; and a second control surface disposed on the second dielectric layer such that that the first and second control surfaces face each other, the second control surface for receiving a second control voltage, wherein respective polarities of the first and second control voltages control the position of the cantilever beam for actively opening and actively closing the switch.

4. The switch according to claim 3, wherein the cantilever beam, the cantilever support member, and the first conductive surface are connected so as to be at the same electrical potential.

5. A method of controlling a micromechanical switch, comprising:

applying a first control voltage having a first polarity to a first control surface spaced from a cantilever beam by a first insulative layer, such that the first control voltage charges a first capacitor formed by the first control surface, the first insulative layer and the cantilever beam;

applying a second control voltage having a second polarity, which is opposite to that of the first control voltage, to a second control surface spaced from a first conductive layer by a second insulative layer such that the second control voltage charges a second capacitor formed by the second control surface, the second insulative layer and the first conductive layer for causing an end of the cantilever beam to touch a contact so as to close the switch; and switching a polarity of one of the first and second control voltages so as to open the switch.

6. The method according to claim 5, further including placing cantilever beam, a cantilever support member and the first conductive surface at substantially the same electrical potential.

7. The method according to claim 5, further including providing substantially equal and opposite polarity voltages on the first and second control voltages when closing the switch.

8. The method according to claim 5, further including providing substantially equal and same polarity voltages on the first and second control voltages when opening the switch.

9. The method according to claim 5, further including connecting a low impedance circuit to at least one of the first and second capacitors for reducing a capacitor charging time.

10. The method according to claim 5, further including providing DC voltages on the first and second control voltages.

11. The method according to claim 5, further including providing AC voltages on the first and second control voltages.

12. The method according to claim 5, further including setting the first control voltage to about zero volts when closing the switch.

13. The method according to claim 5, further including setting the second control voltage to about zero volts when closing the switch.

14. The method according to claim 5, further including maintaining same polarity signals on the first and second control voltages after the switch is open.

15. The method according to claim 5, wherein the first control voltage is about positive fifty volts with respect to the cantilever beam, the cantilever support member, and the first conductive surface when closing the switch.

16. The method according to claim 15, wherein the second control voltage is about negative fifty volts with respect to the cantilever beam, the cantilever support member, and the first conductive surface when closing the switch.

17. The method according to claim 5, wherein movement of the cantilever beam towards the contact interrupts an optical path.

18. The method according to claim 5, further including coupling a load to the contact.

19. The method according to claim 18, further including coupling a load voltage to the load.

* * * * *